US007862480B2

(12) United States Patent
Sudeith et al.

(10) Patent No.: US 7,862,480 B2
(45) Date of Patent: Jan. 4, 2011

(54) SAFETY MAT SECUREMENT ASSEMBLY

(75) Inventors: Timothy S. Sudeith, Edina, MN (US); Lyle Helke, Marine on St. Croix, MN (US); Jeremy Mariette, Crystal, MN (US)

(73) Assignee: Everlast Climbing Industries, Inc., Mendota Heights, MN (US)

( * ) Notice: Subject to any disclaimer, the term of this patent is extended or adjusted under 35 U.S.C. 154(b) by 1647 days.

(21) Appl. No.: 11/061,583

(22) Filed: Feb. 18, 2005

(65) Prior Publication Data

US 2005/0192160 A1 Sep. 1, 2005

Related U.S. Application Data

(60) Provisional application No. 60/545,543, filed on Feb. 18, 2004, provisional application No. 60/628,458, filed on Nov. 16, 2004.

(51) Int. Cl.
*A63B 21/00* (2006.01)
(52) U.S. Cl. .................... 482/35; 482/148; 248/231; 24/600.4
(58) Field of Classification Search ............. 5/907, 5/420, 639, 640, 697, 653; 248/304, 100, 248/307, 231, 903; 182/40, 49; 52/506.01, 52/309.9; 211/86.1, 13.1, 28; 296/100.14, 296/111; 24/600.4, 600.7, 600.8, 601.6; 482/124, 35, 904, 907; 135/97
See application file for complete search history.

(56) References Cited

U.S. PATENT DOCUMENTS

| | | | | | |
|---|---|---|---|---|---|
| 275,537 | A | * | 4/1883 | Straw | 24/600.8 |
| 331,160 | A | * | 11/1885 | Riley | 24/598.5 |
| 1,005,872 | A | * | 10/1911 | Preigergast | 294/82.27 |
| 1,060,294 | A | * | 4/1913 | Snouffer | 441/128 |
| 3,367,001 | A | * | 2/1968 | Raschke | 24/599.5 |
| 4,590,714 | A | * | 5/1986 | Walker | 250/585 |
| 5,247,902 | A | * | 9/1993 | Williams | 119/706 |
| 5,626,544 | A | * | 5/1997 | Foresto | 482/124 |
| 6,202,235 | B1 | * | 3/2001 | Salhanick | 5/653 |
| 6,216,374 | B1 | * | 4/2001 | Lawrence | 40/604 |
| 7,000,359 | B2 | * | 2/2006 | Meyer | 52/309.9 |
| 7,406,977 | B1 | * | 8/2008 | Shires | 135/97 |

* cited by examiner

*Primary Examiner*—Jerome Donnelly
(74) *Attorney, Agent, or Firm*—Anthony G. Eggink; Katrina M. Eggink

(57) ABSTRACT

A safety mat securement assembly for providing open and a closed position for a climbing wall assembly using a safety mat. The safety mat securement assembly utilizes a plurality of security hand hold members each having latching means and a safety mat having a plurality of bottom securement members, top and side loop members. The security hand hold members may be used as hand holds on the climbing wall assembly and may have a locking structure. The bottom securement members function to hold the safety mat to the bottom of a climbing wall assembly during both open and closed positions of the safety mat. The mat securement assembly is opened or unlocked by loosening the latching means, removing security mat top loop members from the hand hold, and placing the mats on the floor along the base of the climbing wall. When in closed or locked position, the security mats may contain a printed message communicating that the climbing wall is closed and climbing should not take place. A cover member may be provided to further secure the climbing wall.

24 Claims, 4 Drawing Sheets

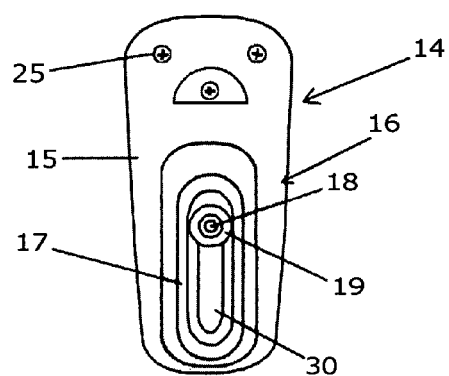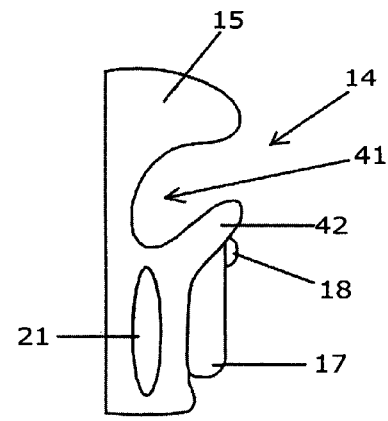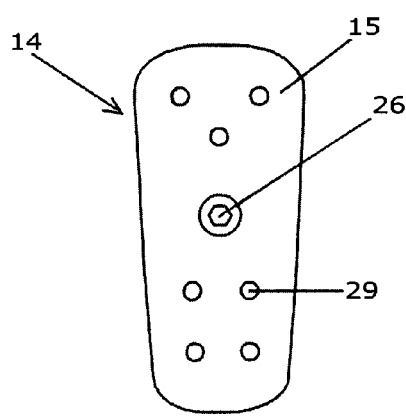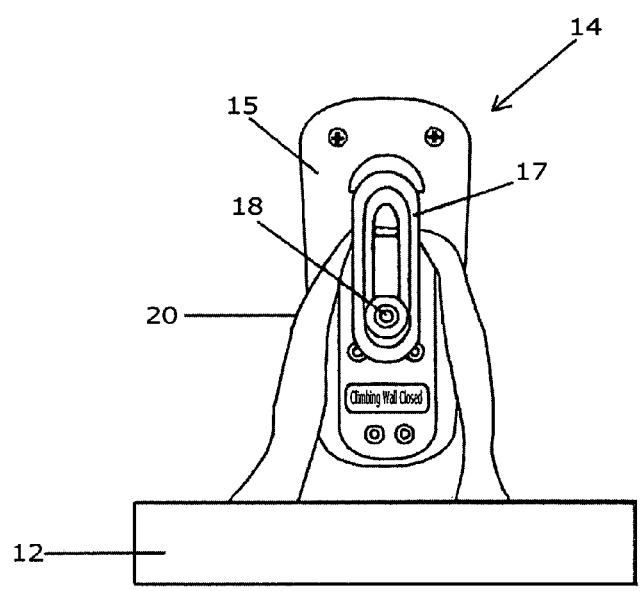
FIG 1
FIG 2
FIG 3
FIG 4

SAFETY MAT SECUREMENT ASSEMBLY

This application claims the benefit of U.S. Provisional Patent Application Nos. 60/545,543 and 60/628,458, filed on Feb. 18, 2004 and Nov. 16, 2004, respectively.

BACKGROUND OF THE INVENTION

The present invention relates generally to climbing wall assemblies and to safety mats that are used in connection with climbing wall environments. Particularly, this invention relates to a safety mat securing and locking assembly which is used in combination with the safety mats utilized for climbing wall structures. More particularly, this invention relates to a hand hold structure with a latch assembly constructed and arranged to secure the safety mats against the climbing wall when the latter is not in use.

Artificial climbing and bouldering walls are increasingly popular and used due to the increase in physical fitness awareness generally and in the rock climbing and bouldering sports particularly. Climbing wall assemblies are being provided to introduce children into the climbing sports in a safe and educational manner. Such climbing wall assemblies are disclosed in pending U.S. patent application Ser. No. 10/236,728, filed on Sep. 6, 2002, the teachings of which are fully incorporated by reference herein. Other climbing wall structures and environments are also known and for which the safety securement assembly of this invention may be utilized, for example, assembled climbing walls, indoor or outdoor, and existing wall structures such as concrete block, cinder block, paneled walls or like support structures.

In order to provide children and other climbers with a safe climbing environment, various safety features are utilized in conjunction with climbing wall assemblies. For example, safety mats may be provided on the floor areas surrounding and adjacent the climbing wall assembly so that should a climber fall, the landing area is padded. It is therefore desirable to secure the mats to the wall structure to ensure that the proximity of the mats remains and that they do not slide away from the wall area. Artificial climbing walls are often located in a gym or designated play area where children may otherwise play. Thus, there is a need for a wall covering to protect children from running into the wall surface and to limit access to the climbing wall. Further, children, particularly young children, should be supervised when using the climbing wall. Thus, there is a need for a wall covering to prevent the unauthorized use of the climbing wall, for example, when proper supervision is not available or when the climbing wall is otherwise not available for use.

Although the prior art discloses the use of a cable system, for example, to secure a mat against a portion of the climbing wall, that system has been found cumbersome to utilize. The prior art also discloses safety mat securement systems that are located above the climbing wall structure. These systems are likewise burdensome because they may be located too high to be easily reached and are not aesthetically pleasing.

A need exists for a safety mat securement and locking assembly for use with climbing walls that secure the mat both when in use on the floor as a safety mat and when in use as a wall covering. A further need exists for a mat securement assembly which is incorporated into a climbing wall and which is quick and easy to use. A further need exists for a mat securement system that warns children and other climbers that the wall is temporarily closed and that climbing should not take place.

SUMMARY OF THE INVENTION

The safety mat securement assembly of the invention is constructed and arranged to provide an open or unlocked position and a closed or locked position for a safety mat used in connection with a climbing wall structure. The safety mat securement assembly comprises a plurality of security hand hold members or other locking structures that are incorporated into the climbing wall and a mat with a plurality of bottom, top and side securement members which connect the climbing wall and the mat. Each security hand hold member comprises a latching means which includes a latch member and a fastening member. The latch member preferably slides between an open position and a closed position and can be secured in either position using the fastening member. When in the open position the hand hold member functions as an operative hand hold. The fastening member may be a screw structure, for example, having a unique head configuration which requires a cooperating wrench to loosen and tighten, i.e., a star-shaped screw head requiring a mating operating tool. A locking system may also be incorporated into or used in conjunction with the latching means. The security hand hold members have means for fastening to a wall structure. Likewise, other locking structures may be utilized having means for fastening to the wall structure for positioning in specified positions.

A security mat constructed for use with the climbing wall preferably includes a plurality of top loop members which are adapted to be looped into the security hand hold member, specifically around the latch member of the security hand hold member. A plurality of securement members are preferably located at the bottom end of the safety mat opposite the top loop members and function to hold the safety mat to the bottom of a wall climbing assembly during both open and closed positions of the safety mat. Loop members may also be provided to the sides of the mat structure to be used with positioned hand holds to secure the sides of the mat to the wall to discourage side entry during periods of non-use. The bottom securement members may be tabs or flaps or have like configurations and which are secured to the wall by means of fasteners or plate/fastener structures. A top wall cover member may also be provided for use with the safety mat securement assembly to cover the exposed top portion of a climbing wall when the safety mats are in locked position over the climbing wall surface.

The securing assembly of the present invention may be opened or unlocked by loosening the bolt member with its corresponding tool or wrench, removing the mat loop members from the hand hold, and placing the mats on the floor along the base of the climbing wall. The bolt member may then be tightened in its open position so that the security hand hold member may be used as a typical hand hold for the wall climbing. The security mats preferably have a printed message on the bottom side to communicate that the climbing wall is closed and climbing should not take place when the mat is secured to the wall, for example showing a "no climbing", "wall closed" or like message. The bottom of the mat may also have window members secured thereto for receiving printed informational inserts. The cooperating top cover member also preferably has a viewable printed message when in use, for example a "climbing wall closed" message.

It is an advantage of the present invention to provide a safety mat securement assembly that can be used to secure a safety mat to the base of a climbing wall assembly. It is another advantage of the present invention to secure the safety mat in an upright or storage position against the climbing wall in a manner so that a child or other climber is deterred from entry between the climbing wall and the mat. It is another advantage to provide a security system which communicates to children via a clear message that climbing is not to take place. It is yet another advantage of the present invention to provide a safety mat securement assembly that is easy to latch and unlatch so that the climbing wall is either readily accessible or in a closed state. It is a further advantage of the present invention to provide a safety mat security assembly which utilize components which can be used as a hand hold and mat for a climbing wall assembly.

These and other benefits of this invention will become clear from the following description by reference to the drawings.

BRIEF DESCRIPTION OF THE DRAWINGS

FIG. 1 is a front view of the security hand hold member of the safety mat securement assembly of the present invention;

FIG. 2 is a side view of the security hand hold member of FIG. 1 and showing the hand hold member in an open position;

FIG. 3 is a rear view of the security hand hold member of FIG. 1;

FIG. 4 is a front view of the security hand hold member in a closed position;

DESCRIPTION OF THE PREFERRED EMBODIMENTS

Figure 5A:
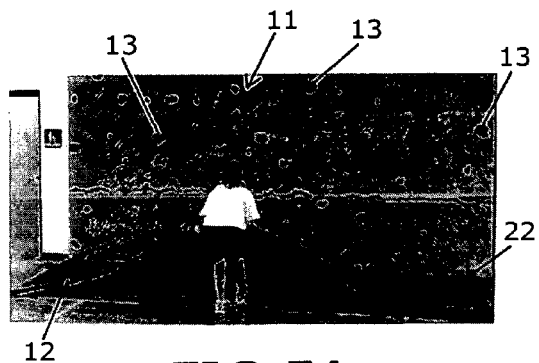
FIG. 5a shows a climbing wall assembly having a safety mat assembly being lifted from a usable position to a secured closed position.

The safety mat securement assembly of the present invention is constructed and arranged for use with climbing walls, i.e., for artificial walls, free standing, existing walls and panels attached to existing support wall structures. The safety mat securement assembly comprises security hand hold members, top and side mat loop members, and bottom mat securement members to secure a safety mat to the climbing wall assembly. The securement assembly provides two positions for a safety mat used with a climbing wall assembly, namely, on the floor or against the wall, thus making the climbing wall open or closed for use. The security hand hold members are constructed and arranged to be incorporated onto a climbing wall assembly, for example, using screws or other fasteners known in the art, and may be used as a hand hold for climbing the wall. Alternatively, other locking means may be utilized to secure the safety mat. The top and side loop members are constructed and arranged to fit into and be secured within the security hand hold members or other locking means. The bottom securement members are constructed and arranged to be fastened or secured to the bottom of a climbing wall assembly.

When the safety mat is on the floor it is preferably adjacent and attached to the bottom off the climbing wall assembly using the bottom securement members. When the safety mat is against the wall it is preferably attached to both the bottom of the climbing wall using the bottom securement members as well as to the positioned security hand hold members on the climbing wall using the top and side loop members.

Referring to FIGS. 1-3, security hand hold member 14 is shown comprised of body member 15 and latching means 16. Body member 15 of security hand hold member 14 is constructed and arranged having concave opening 41 and grip portion 42 thereby enabling the security hand hold member to be utilized as a hand hold when not in use for holding a mat structure against a climbing wall. Latching means 16 is shown comprised of bolt or fastening member 18, corresponding fastener 26, washer 19 and latch member 17 having slot 30. The security hand hold member 14 may be fastened to a climbing wall assembly using fasteners 25 that extend through apertures 29 of the body member 15. The security hand hold members 14 may be mounted or fastened to a climbing wall using any fastening means known in the art, for example with wood or concrete screws or other means. Logo label 21 is shown located on, i.e., molded into, the side of body member 15 to identify the manufacturer or manufacturer's mark, but may be located anywhere thereon. The hand hold members of the present invention are preferably made of a polymeric structure, i.e., a molded plastic or urethane resin.

To engage the latching means 16 in its locking and unlocking function, bolt member 18 is loosened, latch member 17 is slid up or down along slot 30 and bolt member 18 is tightened when the latch member is in its desired position. FIG. 4 shows the latch member 17 of hand hold member 14 in a locked position and having a top loop member 20 of a mat structure 12 secured behind latch member 17.

Alternatively, the hand hold member may incorporate a locking system. For example, a key lock or a combination lock may be incorporated into or used in conjunction with the handhold assembly. Thus, after a loop member is positioned onto a grip portion of the hand hold member and the latch member is placed in the locked position, the latch member may be locked in position via a lock key or combination lock (not shown) thereby preventing any tampering. The locking system may be incorporated into the assembly or a separate lock may be used with aligned apertures in the latch member and a portion of the hand hold member.

Preferably, the safety mats of the present invention provide a shock absorbent structure for landing on when using a climbing wall. For example, in one embodiment the safety mats may be approximately two inches thick and constructed of approximately one inch cross-linked polyethylene foam laminated or bonded to approximately one inch polyurethane foam. The mats are also preferably covered with 14 oz vinyl with polyester reinforcing, for example. The mats are preferably approximately four feet wide by six feet long and have Velcro® (hook and loop) fasteners on each side so that they may be attached to additional mats in order to span an area containing a climbing wall. The visible or bottom side of the mat structure when the mat structures are secured to the hand holds preferably contains a message to communicate that climbing is not to take place, for example a "No Climbing", "Wall Closed" or like message.

Figure 5B:
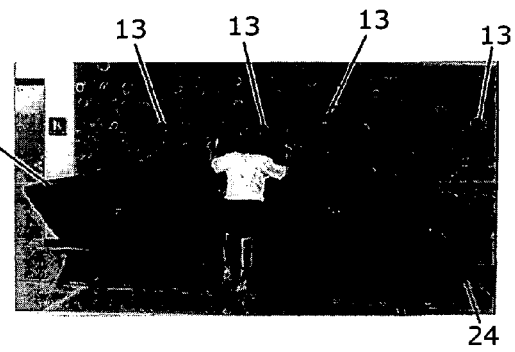
FIG. 5b shows a climbing wall assembly having a safety mat assembly being lifted from a usable position to a secured closed position.
Figure 5C:
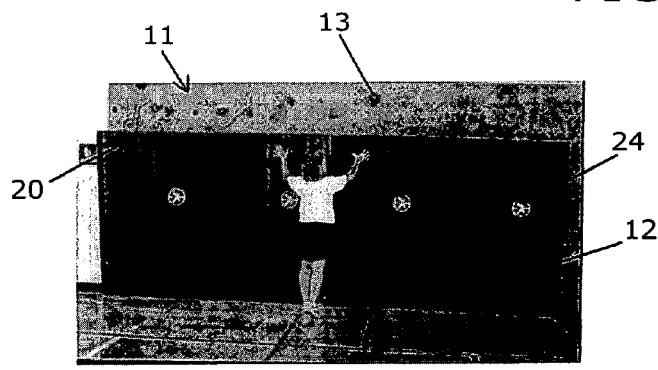
FIG. 5c shows a climbing wall assembly having a safety mat assembly being lifted from a usable position to a secured closed position.

FIGS. 5a-5c show the sequence of a climbing wall assembly 11 having a safety mat assembly 12 being lifted from open position to closed position. Climbing wall assembly 11 is shown having hand holds 13 and a safety mat structure 12. FIG. 5a shows the mat structure 12 being initially lifted off the ground. Bottom securement members 22 are shown. FIG. 5b shows the mat structure being further lifted and FIG. 5c shows the mat structure 12 in position against the climbing wall assembly 11. Warning message 24, i.e. "No Climbing" or "Wall Closed", is shown on the underside of the mat structure 12 to inform users that the wall is closed. A warning message may be applied to a mat structure via a silk screen printing process or another like process.

Figure 6A:
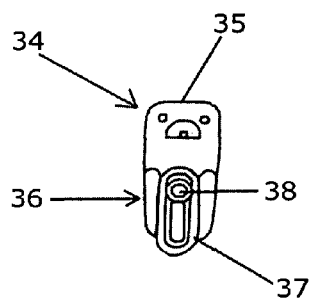
FIG. 6a shows a security hand hold member in the open position.
Figure 6B:
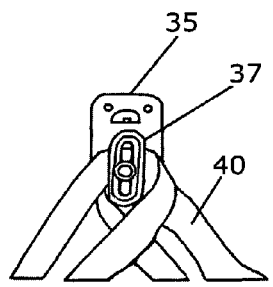
FIG. 6b shows the latch member of a security hand hold member being slid to a closed position.
Figure 6C:
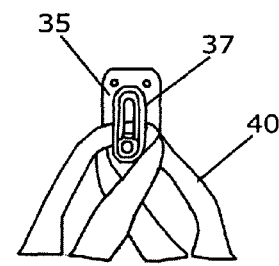
FIG. 6c shows a security hand hold member in locked position and securing a pair of loop members.

FIGS. 6a-c show an alternate embodiment 34 of the hand hold member, which locks and unlocks in a similar manner to the embodiment described with respect to FIGS. 1-4. Hand hold embodiment 34 is shown having body member 35 and a latching means 36 comprising latch member 37 and bolt member 38. FIG. 6a shows the latch member 37 in an open position. FIG. 6b shows two top loop members 40 from a mat structure secured behind the latch member 37 which is being slid upwards into the locked position. FIG. 6c shows the latch member 37 in a closed position, holding the top loop members 40 in place, and thus effectively closing a climbing wall assembly by securing the mat to the front of the climbing wall.

Figure 7:
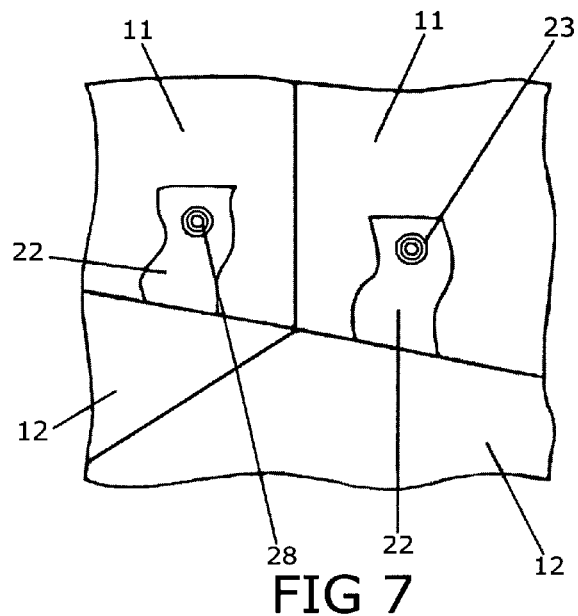
FIG. 7 is a perspective view of a bottom securement member of the safety mat securement assembly of the present invention.
Figure 9:
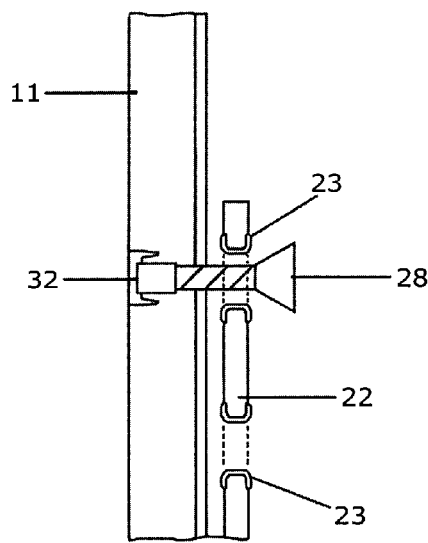
FIG. 9 is a cross-sectional view of a bottom securement member of the present invention.
Figure 10:
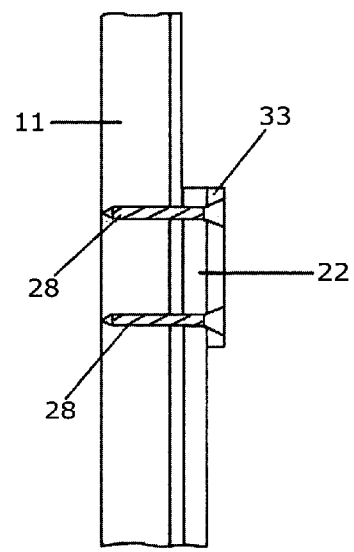
FIG. 10 is a cross-sectional view of an alternate embodiment of the bottom securement member.

FIG. 7 shows mat structure 12 having bottom securement member tabs 22 utilizing grommet 23 for attachment of the mat structure to a wall or climbing assembly 11, using fastener 28, for example a flat head cap screw. FIG. 9 is a cross-sectional view of an alternate embodiment of the bottom securement member 22 being attached to the climbing wall 11 using cooperating fastening components 28 and 32 and grommet 23. A second grommet 23 is shown disposed on bottom securement member 22 to further secure member 22 using cooperating fastening components 28 and 32. Fastener 32 may be a t-nut, for example and is used in conjunction with fastener or screw 28 to form a fastening structure to hold the bottom securement member 22 to a paneled climbing wall 11. Any means known in the art may be used to attach the bottom securement members to a climbing wall including, for example, plates made of wood, plastic, metal or another like material may be utilized to secure the securement members to a wall. FIG. 10 shows plate member 33 utilized to secure the bottom securement member 22 to climbing wall assembly 11 via fasteners 28. The plate member 33 may have the width of the securement tab 22 and which maintains the integrity of the tab structure (webbing stitched or fastened to the mat body) during use.

Figure 8:
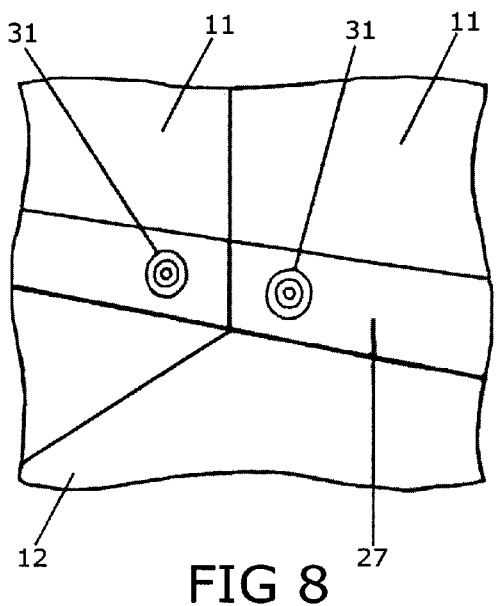
FIG. 8 is an alternate embodiment of the bottom securement member.

Preferably, each mat structure has a plurality, i.e., two top loop members securely attached to the top of the mat and two bottom securement member tabs attached to the bottom, although other numbers of top loop members and configurations of bottom securement members are within the purview of this invention. As further discussed below, side loops may also be utilized to secure the mat structure to the climbing wall. FIG. 8 shows an alternate embodiment 27 of a bottom securement member in a flap form. Bottom securement member flap 27 is shown having grommets 31 and attached to mat structure 12. Bottom flaps 27 may be provided in various sizes to accommodate various climbing wall configurations, for example 4 inch and 12 inch wide flaps. The top loop members and bottom securement members may be sewn to the safety mat or attached using other fastening means known in the art. The top loop members are preferably constructed of webbing, vinyl or like material, for example, seatbelt material. The bottom securement tabs are preferably also constructed of webbing or a like material.

Figure 11:
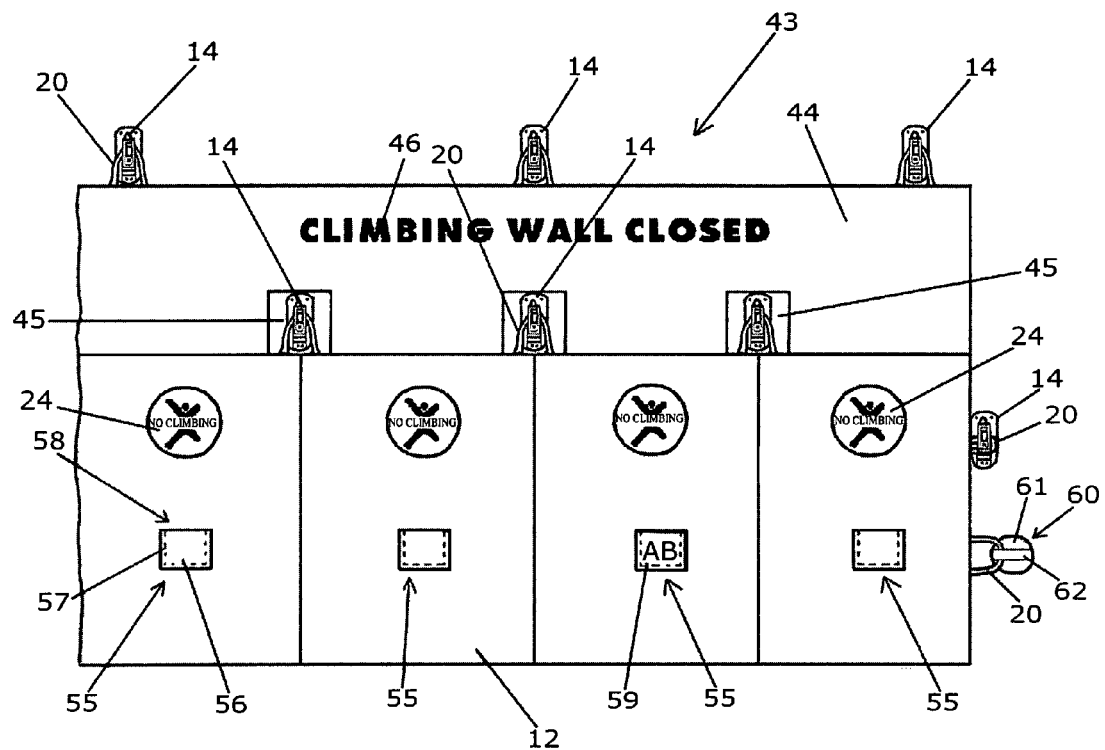
FIG. 11 is a frontal view showing the safety mat securement assembly of the present invention in the closed position and in use with a top cover member.

FIG. 11 shows safety mat structure 12 in an upright/locked position against climbing wall assembly 11. Top cover member 43 is provided and shown in use with the safety mat securement assembly of the present invention. Top cover member 43 is provided to enable the exposed climbing wall portion to be covered and locked, for example, by spanning the exposed climbing wall above the safety mats. For example, if the climbing wall is ten feet high and the safety mats are six feet tall, then four feet of the climbing wall would remain exposed above the safety mats when in a locked position. The top cover member of the present invention may be a reinforced fabric, a plastic coated fabric, or a polymeric flexible material, i.e., made of "vinyl", a plasticized polyvinylchloride or a like material and can be constructed of various lengths and widths, for example, to cover various sizes of climbing walls. The top cover member preferably adds security to the safety mat securement assembly of the present invention as well as providing a system that is light in weight, affordable and easy for one person to maneuver.

The top cover member 43 may be held in place, above or on the top portion of the climbing wall assembly, for example using Velcro® (hook and loop fastener system), specially designed hand holds, pulleys, grommets, hooks, other securement structures and combinations thereof. FIG. 11 shows top cover member 43 having elongated flexible body 44 being held in place by loops 20 within cooperating security hand hold members 14 which are shown mounted on the wall above the climbing wall. When securing a climbing wall using the top cover member 43, the flexible body 44 of the top cover 43 is first spread along the exposed wall portion of the climbing wall and securing the loops to the hand hold members 14 shown above the climbing wall. For example, flexible body 44 is shown to have apertures 45 which expose security hand hold members 14 which are mounted on the climbing wall and which are used to secure safety mat 12 as discussed above. Thus, when the security hand hold members 14 are in the locked position, the apertures function to hold the top cover member in place. Informational or warning message 24 is shown printed on the surface of safety mat 12. Further enlarged warning message 46, "CLIMBING WALL CLOSED", is shown disposed on the top portion of top cover member 43. The warning messages may be affixed to the safety mat and the top cover member via a silk screen printing process or other printing means.

It is also within the purview of this invention to secure a mat that does not utilize bottom securement tabs or top loop members. For example, a webbed envelope structure having bottom securement tabs and top loop members as described above may receive a mat for use with the security hand hold members of the present invention.

As further shown in FIG. 11, the securement mat 12 is shown to have window structures 55 secured thereto. The window structures 55 are shown to have a clear plastic member 56 which is affixed to the mat 12 by means of peripheral fastening means 57, i.e., stitching, adhesive or the like. The window member 55 has a clear plastic member 56 with an open upper side 58. An insert 59 is shown in one of the window members 55. Further, loop members 20 are shown secured to the side of the mat 12, and used in conjunction with security hand hold members 14. The lateral securement prevents children from climbing or entering behind the mat 12 when it is secured to the climbing wall. Further, locking member 60 is shown positioned to the side of the climbing wall and having body 61 and latch 62. The locking member 60, for example, may not be a hand hold and may be constructed and arranged to only secure a mat loop member 20. The locking member 60 may have a loop holding and securing portion with a lock, i.e., requiring a key or combination or may comprise a lock itself which is secured to the wall.

Figure 12:
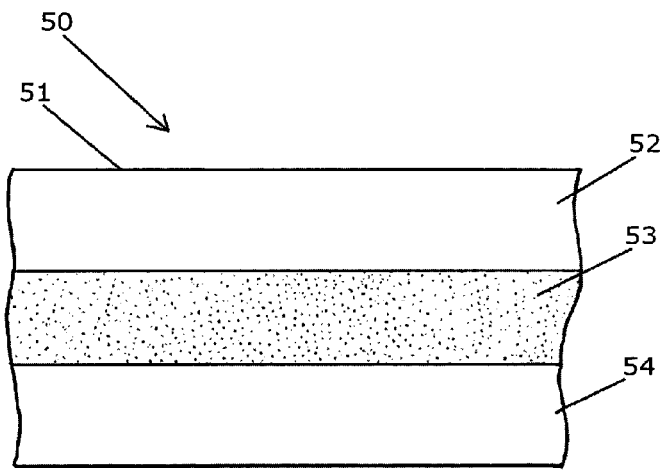
FIG. 12 is a sectional view of a safety mat structure for use in climbing wall environments.

FIG. 12 shows mat structure 50 having a generally planar body 51 comprised of first layer 52, second layer 53 and third layer 54. Layer 53 is preferably constructed of polyurethane foam and layers 52 and 54 are preferably constructed of a cross-linked polyethylene foam. The three layers may be laminated or otherwise secured into a unitary structure. Each layer is preferably approximately one inch thick. Thus, each mat structure 50 has an approximately three inch total thickness and is preferably covered with 14 ounce vinyl with polyester reinforcing. The mats are preferably four by six square feet in area and include a fastener, such as Velcro® (hook and loop) on at least two sides for attachment to other mats and to the base of a climbing wall when in an unlocked or open position. The underside of each mat preferably contains a warning or informational label that is visible when the mat is in a closed or locked position indicating that no climbing may take place.

As many changes are possible to the safety mat securement assembly of this invention, utilizing the teachings thereof, the description above and the accompanying drawings should be interpreted in the illustrative and not the limited sense.

That which is claimed is:

1. A safety mat securement assembly for a climbing wall structure, said assembly comprising:
    a) at least one hand hold member for use by a climber on a climbing wall structure, said hand hold member having a latching means movable from an open to a closed position and a securement member for enabling said latching means to be in an open or closed position;
    b) a safety mat having at least one loop member, said loop member being constructed to cooperate with said latching means of said hand hold member, said safety mat being comprised of a flexible planar structure comprising a shock absorbent member and an exteriorly disposed cover structure, said shock absorbent member being comprised of a compressible foam structure having three polymeric layers; and
    c) whereby said latching means is moved from an open position to a closed position by loosening said securement member, moving said latching means into the open or closed position and tightening said securement member.

2. The safety mat securement assembly of claim 1, wherein said latching means comprises a slide member having an elongated aperture therethrough and wherein said securement member comprises a threaded member having a head adapted for engagement by a tool and wherein said securement member is a bolt.

3. The safety mat securement assembly of claim 1, wherein said polymeric layers include a first layer of cross-linked polyethylene foam, a second layer of polyurethane foam and a third layer of cross-linked polyethylene foam.

4. the safety mat securement assembly of claim 1, wherein said at least one loop member is comprised of a nylon webbing and wherein said safety mat has informational indicia printed thereon.

5. The safety mat securement assembly of claim 1, wherein said cover structure has a top surface and a bottom surface and wherein said bottom surface has at least one window member fastened thereto, said window member comprising a clear portion for receiving a printed insert.

6. The safety mat securement assembly or claim 1, wherein said safety mat has a top, a bottom and sides and wherein at least one loop member is attached to said top, bottom and sides.

7. A safety mat securement assembly for an artificial climbing wall having a top and a bottom comprising:
    a) at least one safety mat structure having a first end and a second end, said safety mat structure having top mat securement means at said first end and bottom mat securement means at said second end, wherein said top mat securement means is at least one loop member and wherein said bottom mat securement means is constructed to secure said mat at or near the bottom of a climbing wall so that the mat can pivot about said bottom mat securement means;
    b) at least one hand hold structure for placement on said climbing wall, said hand hold structure having an outwardly extending grip member for use by a climber on the climbing wall and which forms a cavity for receiving said at least one loop member and a slidable latch member for closing said cavity and securing said loop member, said slidable latch member having a securement member for securing said latch member in a position opening or closing said cavity; and
    c) whereby said latching member is slid from an open position to a closed position by loosening said securement member, moving said latching means into the open or closed position and tightening said securement member.

8. The safety mat securement assembly of claim 7, wherein said bottom mat securement means is a tab member attached to one side of a safety mat, said tab constructed to be secured at or near the bottom of the climbing wall.

9. The safety mat securement assembly of claim 8, wherein said tab member contains at least one grommet for receiving at least one fastener for attachment at or near said bottom of the climbing wall.

10. The safety mat securement assembly of claim 8, wherein said assembly further includes at least one plate member and at least one fastener member for securing said tab member at or near said bottom of the climbing wall.

11. The safety mat securement assembly of claim 7, wherein said safety mat structure comprises three polymeric layers.

12. The safety mat securement assembly of claim 11, wherein said layers include a first cross-linked polyethylene foam layer, a second polyurethane foam layer and a third cross-linked polyethylene foam layer.

13. The safety mat securement assembly of claim 7, wherein said hand hold structure is constructed of a polymeric structure and wherein said safety mat structure includes a cover member made of a reinforced polymeric material.

14. The safety mat securement assembly of claim 7, wherein said safety mat securement assembly further includes a side securement means and wherein said side securement means comprises a loop member and a cooperating locking hand hold structure.

15. The safety mat securement assembly of claim 13, wherein said cover member includes a clear window member constructed to form a space to receive a printed insert.

16. The safety mat securement assembly of claim 7, wherein said assembly further includes a flexible tarp member constructed to be secured at the top of said climbing wall and having loop members which cooperate with said at least one hand hold structure.

17. A safety mat securement assembly for a climbing wall having a top and a bottom, said assembly comprising:
   a) a least one safety mat structure having a first end and a second end, said safety mat structure having at least one top mat securement member at said first end and at least one bottom mat securement member at said second end, wherein said at least one bottom mat securement member is constructed to be secured at or near the bottom of said climbing wall so that the mat can pivot about said at least one bottom mat securement member, said safety mat structure being comprised of a flexible planar structure comprising a shock absorbent member and an exteriorly disposed cover structure, said shock absorbent member being comprised of a compressible foam structure having a plurality of polymeric layers;
   b) at least one receiving structure for said top mat securement member, said receiving structure being disposed on or near said climbing wall, said receiving structure having a latch member and a latch securement member and being constructed secure said at least one top mat securement member, thereby allowing said safety mat structure to be secured against said climbing wall to indicate that the climbing wall is closed; and
   c) whereby said latch member is moved from an open position to a closed position by loosening said latch securement member, moving said latch member into the open or closed position and tightening said latch securement member.

18. The safety mat securement assembly of claim 17, wherein said top mat securement member is a loop member and wherein said bottom mat securement member is a tab member.

19. The safety mat securement assembly of claim 17, wherein said safety mat structure further has a top surface and a bottom surface and wherein said bottom surface has at least one window member fastened thereto, said window member comprising a clear portion for receiving a printed insert.

20. The safety mat securement assembly of claim 18, wherein said assembly further includes at least one plate member having a predetermined size and at least one fastener member being constructed to cooperate with said tab member to secure said tab member at or near said bottom of said climbing wall.

21. The safety mat securement assembly of claim 17, wherein said top mat securement member receiving and securement structure is a hand hold member having a formed, rigid body member having a generally planar mounting surface and a generally curved exterior surface extending therefrom and having a top portion, a cavity and an outwardly extending bottom portion all defined by said generally curved exterior surface, said top portion having an indentation, said bottom portion having a grip member comprising opposing upwardly extending grip portions, wherein said latching means is a slidable elongated latch member constructed to slide between a locked position and an unlocked position wherein said latch member is aligned with said bottom portion in said unlocked position and extends across said cavity and into said indention of said top portion in said locked position, said slidable elongated latch member being constructed and arranged to slide between said opposing upwardly extending grip portions of said grip member.

22. A safety mat securement assembly for a climbing wall having a top and a bottom, said assembly comprising:
   a) a least one safety mat structure having a first end and a second end, said safety mat structure having at least one top mat securement member at said first end and at least one bottom mat securement member at said second end, wherein said at least one bottom mat securement member is to be secured at or near the bottom of said climbing wall so that the mat can pivot about said at least one bottom mat securement member, said safety mat structure being comprised of a flexible planar, structure comprising a shock absorbent member and an exteriorly disposed cover structure, said shock absorbent member being comprised of a compressible foam structure having at least one polymeric layer;
   b) at least one receiving structure for said top mat securement member, said first securement structure disposed on or near said climbing wall, said receiving structure having a latch member and a latch securement member and being constructed to secure said at least one top mat securement member, thereby allowing said safety mat structure to be secured against said climbing wall to indicate that the climbing wall is closed; and
   c) whereby said latch member is moved from an open position to a closed position by loosening said latch securement member, moving said latch member into the open or closed position and tightening said latch securement member.

23. The safety mat securement assembly of claim 22, wherein said exteriorly disposed cover structure includes a clear window member constructed to form a space to receive a printed insert.

24. The safety mat securement assembly of claim 22, wherein said compressible foam structure comprises a plurality of polymeric layers including a first layer of cross-linked polyethylene foam, a second layer of polyurethane foam and a third layer of cross-linked polyethylene foam.

* * * * *

UNITED STATES PATENT AND TRADEMARK OFFICE
CERTIFICATE OF CORRECTION

| | | |
|---|---|---|
| PATENT NO. | : 7,862,480 B2 | Page 1 of 1 |
| APPLICATION NO. | : 11/061583 | |
| DATED | : January 4, 2011 | |
| INVENTOR(S) | : Timothy S. Sudeith, Lyle Helke and Jeremy Mariette | |

It is certified that error appears in the above-identified patent and that said Letters Patent is hereby corrected as shown below:

--In Column 9, line 23, please add the word "to" between the words "constructed" and "secure".--

Signed and Sealed this
Twenty-second Day of February, 2011

David J. Kappos
*Director of the United States Patent and Trademark Office*